United States Patent Office 3,396,145
Patented Aug. 6, 1968

3,396,145
COMPOSITIONS OF EPOXY RESIN, LACTAM AND ALIPHATIC POLYCARBOXYLIC MATERIAL
Geza Gruenwald, Erie, Pa., assignor to General Electric Company, a corporation of New York
No Drawing. Continuation of application Ser. No. 247,284, Dec. 26, 1962. This application May 19, 1967, Ser. No. 639,913
8 Claims. (Cl. 260—47)

ABSTRACT OF THE DISCLOSURE

Epoxy resins are heat cured with lactam and polyfunctional aliphatic acid or acid anhydride to provide electrical insulating compositions having good low and high temperature flexibility.

---

This application is a continuation of Ser. No. 247,284, filed Dec. 26, 1962.

This invention relates to new and useful resin compositions. More particularly, it relates to such compositions which are characterized by salutary physical characteristics, particularly high density at low temperatures and good resistance to thermal degradation, as well as by long shelf life and quick cure.

The use of acidic and basic type curing agents for epoxy or ethoxyline resins is well known. It is also well known, more particularly, to use for such resins curing agents incorporating lactams. For example, U.S. Patents 2,847,341; 2,847,342 and 2,847,343, assigned to the same assignee as this invention, described the use of curing agents incorporating lactams and basic materials as constituents. It is also known that lactams may be used alone as curing agents for epoxy resins provided a high enough curing temperature is used. While epoxy resins cured with agents having lactam alone or as a constituent part thereof are useful, it has been found that generally rather high curing temperatures are required, and that in certain cases the mechanical properties of the epoxy resin so cured leave something to be desired, particularly at rather low temperatures. For example, it is often desirable to insulate electrical equipment which must operate at temperatures of the order of 150° C. but which, at the same time, as for example, in the case of the electrical locomotive equipment, may be exposed to temperatures as low as −30° C. to −40° C. and be capable of withstanding stresses based on thermal shrinkage and mechanical abuse at such temperatures. While it is possible to obtain low temperature elasticity in epoxy resin compositions by the use of relatively long chain polyfunctional aliphatic acids, it has been found that the reaction time or curing time of such materials is quite long and that such compositions are oftentimes so viscous or even solid that they are difficult to handle, particularly where it is desired to use a solventless system.

It is, therefore, a principal object of this invention to provide new and useful epoxy resin compositions which are capable of retaining their elasticity and other desirable physical and electrical characteristics at extreme operating temperatures and which, at the same time, are easy to handle.

Briefly, the invention relates to epoxy resin compositions cured with curing agents comprising a combination of from about 15 to 65 parts by weight of a long chain polyfunctional aliphatic acid or anhydride having a carbon chain length of from about 6 to 14 and from about 5 to 10 parts by weight of lactam per 100 parts of epoxy resin.

Those features of the invention which are believed to be novel are set forth with particularity in the claims appended hereto. However, further objects and advantages of the invention will be appreciated from a consideration of the following description.

The epoxy resins having 1,2 epoxy groups which are useful in conjunction with this invention are known in the art. They are described, for example, in United States Patents 2,324,483 and 2,444,333, among others. Generally, the resin described therein are the reaction product of an epihalogenohydrin, such as epichlorohydrin, and a phenol having at least two phenolic hydroxyl groups, such as bis-(4-hydroxy phenyl)-2,2-propane. The epoxy resins have an average of more than one epoxy group per molecule and can be prepared by reacting a polyhydroxy alcohol or phenol, such as hydroquinone, resorcinol, glycerine and phenol condensation products with ketones. The reaction of epichlorohydrin with bis-(4-hydroxy phenyl)-2,2-propane is typical of such reactions and is as follows:

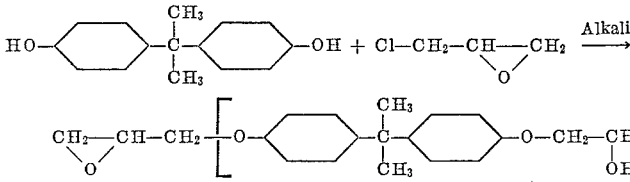

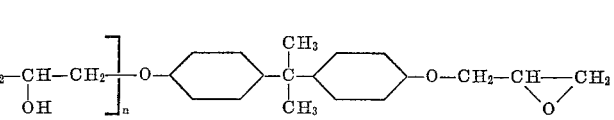

where $n$ has an average value ranging from 0 to about 7. Such ethoxyline resins are sold under the name of Epon by Shell Chemical Corporation, under the name Araldite by the Ciba Company, as Epi-Rez resins by Devoe-Raynolds Company and ERL resins by the Bakelite Company. The data given below for such resins is representative.

TABLE I

| Epoxy Resin | Epoxide Equivalent | M. P., 0° |
|---|---|---|
| Epon 828 | 192 | 9 |
| Epon 834 | 225–290 | 20–28 |
| Epon 1001 | 450–425 | 64–76 |
| Epon 1004 | 905–985 | 97–103 |
| Epon 1007 | 1,600–1,900 | 127–133 |
| Epon 1009 | 2,400–4,000 | 145–155 |
| Araldite 6010 | 192 | (¹) |
| Araldite 6020 | 200–205 | (¹) |
| ERL 2774 | 175–200 | (¹) |
| Epi-Rez | 175–200 | (¹) |

¹ Liquid.

Also useful in connection with the present invention are the epoxylated novolac resins which are derived from polyfunctional phenols of the novolac type and which may be represented ideally by the following formula:

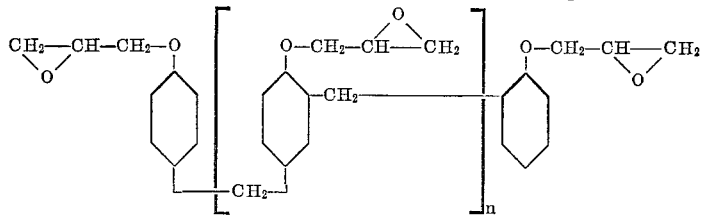

Epoxidized novolac resins of the above types are produced by the Borden Chemical Company under the trade name Epiphen, by the Dow Chemical Company under the designation DEN, and by the Koppers Company under the designation KER. Generally, such resins are made by epoxidizing novolac resins which, in turn, are made in the usual way. Among the patents relating to epoxidized novolac resins in Patent 2,658,885, such patent being familiar to those skilled in the art. Among the specific useful epoxylated novolac resins is Dow DEN–438 which has a molecular weight of 600, a functionality of 3.3, an epoxy equivalent weight of 175 to 182, a specific gravity of 1.220, a viscosity at 125° F. of from about 30,000 to 90,000 cps. Epiphen 825, a product of the Borden Chemical Company, has an epoxy equivalent weight of from about 180 to 200 and a functionality of 3.5 and a specific gravity of about 1.19. The viscosity of this resin at 75° F. is about 750,000 cps. and at 110° F. is about 60,000 cps. Epiphen 847 has an epoxy equivalent weight of 180 to 200, a functionality of 3.3, a specific gravity of 1.12, and a viscosity at 75° F. of from 75,000 to 150,000 cps. Also useful in connection with the invention are other well known epoxy resins, including those prepared from polyolefins.

The lactams useful in connection with the invention include 2-pyrrolidone, 2-piperidone, $\epsilon$-caprolactam (hexahydro-2H-azepin-2-one) and capryllactam (octahydro-2H-azonin-2-one), among others, and in general include any compound having the well known lactam group and no other group reactive with epoxy resins. Thus, morpholone containing an oxygen atom in the ring is useful as are compounds containing a sulfone group besides the lactam group. Mixtures of lactams are also useful and the term "lactam" will be understood to include such mixtures.

The acidic or anhydride curing agents useful in connection with the invention include polyfunctional, long chain aliphatic acids or anhydrides having from 6 to 14 carbon atoms in the main chain of the molecule. It has been found that cyclic acidic curing agents are not suitable because they do not impart the requisite low temperature elasticity to the resinous compositions. The polyfunctional acidic nature of the present materials is useful in promoting the proper degree of cross-linking. It has also been found that aliphatic acidic materials having more than 14 carbons are less compatible with epoxide resins or cure too slowly or lack thermal stability at higher temperatures as well as chemical resistance or have a combination of such deficiencies. Such materials also tend to crystallize and further complicate the use of the materials. On the other hand, it has been found that such acidic materials having less than 6 carbons in the main chain impart insufficient elasticity at low temperatures to the final product. It will be understood that where acid is mentioned, the appropriate anhydride can as well be used.

As pointed out above, it has been found that when lactams alone are used as curing agents for epoxy resins, the reaction or curing temperature required is relatively high. It has also been found that amine type materials tend to accelerate the cure or enhance the cure of epoxy resins with lactams. However, differential thermal analyses showed that when amines are used in conjunction with the lactam, the amine-epoxy resin and the lactam-epoxy resin reactions take place independently of each other and that no interaction between the amine and lactam is observable. It was unexpectedly found that when a small amount of lactam accelerator was used in conjunction with the above acidic materials, a completely new structure resulted and the reaction could be completed at temperatures and times at which the reaction between epoxy resin and lactam alone had only begun. It has also been unexpectedly found that despite the addition of the lactam material with its desirable acceleration of the curing reaction, the low temperature elasticity which is characteristic of the long chain polyfunctional aliphatic acid cured epoxy resin remains or even improves.

The following examples will illustrate the practice of the present invention, it being realized that such examples are to be taken as illustrative only of the many advantages to be obtained thereby. All parts are by weight unless otherwise specified.

TABLE II

| Ex. | Epon 828 | Acidic Agent | $\epsilon$-Caprolactam | Capryllactam |
|---|---|---|---|---|
| 1 | 100 | 32 Polysebacic Acid Anhydride. | 5 | |
| 2 | 100 | 16 Polysebacic Acid Anhydride. | 10 | |
| 3 | 100 | 26 Polysebacic Acid Anhydride. | 2.5 | |
| 4 | 100 | 26 Polysebacic Acid Anhydride. | 5 | |
| 5 | 100 | 52 Polysebacic Acid Anhydride. | 5 | |
| 6 | 100 | 26 Polysebacic Acid Anhydride. | 10 | |
| 7 | 100 | 32.6 Polysebacic Acid Anhydride. | 5 | |
| 8 | 100 | 16.3 Azelaic Acid | 10 | |
| 9 | 100 | 26 Azelaic Acid | 2.5 | |
| 10 | 100 | 26 Azelaic Acid | 5 | |
| 11 | 100 | 32.5 Azelaic Acid | 5 | |
| 12 | 100 | 35 Sebacic Acid | 5 | |
| 13 | 100 | 17.5 Sebacic Acid | 10 | |
| 14 | 100 | 28 Sebacic Acid | 2.5 | |
| 15 | 100 | 28 Sebacic Acid | 5 | |
| 16 | 100 | 35 Sebacic Acid | 5 | |
| 17 | 100 | 15 [1] | 10 | |
| 18 | 100 | 20 [1] | 5 | |
| 19 | 100 | 25 [1] | 10 | |
| 20 | 100 | 30 [1] | 5 | |
| 21 | 100 | 20 [1] | | 6.2 |
| 22 | 100 | 30 [1] | | 6.2 |
| 23 | 100 | 30 [1] | 5 | |
| 24 | 100 | 30 [1] | | 6.4 |
| 25 | 100 | 50 Dodecanedioic Acid | 5 | |

[1] By weight 40% polysebacic acid anhydride, 40% azelaic acid and 20% sebacic acid.

The above materials were cured for 24 hours at a temperature of 150° C. which may be extended from 130° C. to 185° C. for from 6 to 24 hours, the reaction being of a time-temperature nature. There were obtained materials which were rigid at room temperature and 200° C. and were particularly suitable for operating for extended periods at temperatures ranging from 150° C. to 200° C. to temperatures as low as −30° C. to −40° C. While the materials so obtained are rigid, they are possessed of a high room temperature elasticity which unexpectedly exceeds an elongation of over 3.5% at a temperature as low as −40° C. As pointed out above, this elasticity which is maintained over such a wide temperature range is particularly desirable in that differential expansion of the resin and metal parts with which it is in contact does not cause rupture of the seal between the two.

The examples in Table III below illustrate the efficacy of the present invention as compared to compositions containing only an acidic agent. All parts except where otherwise indicated are by weight.

TABLE III

| Example | Epon 828 | Acid Agent | $\epsilon$-Caprolactam |
|---|---|---|---|
| 26 | 100 | [1] 35 | |
| 27 | 100 | [1] 30 | 5 |

[1] By weight 40% polysebacic acid anhydride, 40% azelaic acid and 20% sebacic acid.

The resin compositions of Examples 26 and 27 above were cured for 24 hours at 155° C., and test bars made therefrom were subjected to physical testing at room temperature. The test bars made from the composition of Example 26 were more flexible having a modulus of elasticity of 85,000 p.s.i. as compared to 310,000 p.s.i. for test bars made from the material of Example 27. However, at −40° C. the bars of Example 26 broke at a flexural strength of 9,000 p.s.i. which is equivalent to only 2.9% elongation at the outer fiber. On the other hand, the bars of Example 27 had a flexural strength at −40° C. in excess of 12,000 p.s.i. and an elongation of over 3.5%. The beneficial effect of the caprolactam is also demonstrated by the improvement in thermal stability. After aging the specimens of the examples at 200° C. for 152 hours, the specimens of Example 26 broke at room temperature at a flexural strength of 8,000 p.s.i. with only 2.9% elongation. However, the specimens of Example 27 remained elastic in excess of 3.5% elongation at the outer fiber not only at room temperature but also at −40° C. Further, the specimens of Example 27 had not broken at 11,000 p.s.i. flexural stress.

The present materials are useful for impregnating electrical apparatus such as coils, and the like, and they are particularly advantageous in this respect since they contain no solvent which must later be removed from the system, the consistencies of the present materials varying from relatively low viscosity liquids to materials having a cream-like consistency at room temperature and making for ready handleability. They are also useful for molding and casting purposes and for insulating electrical conductors. The present epoxy resins may be used as such or they may be modified or extended as desired by fillers, such as silica, alumina, iron oxide, barium sulfide, lithium silicate, glass powder, glass and other fibrous materials.

I claim:

1. A composition of matter consisting essentially of the heat reaction product of (1) 100 parts by weight of an epoxide resin containing 1,2 epoxy groups, (2) from about 5 to 10 parts by weight of lactam having no group other than the lactam group reactive with the epoxide resin, and (3) from about 15 to 65 parts of material selected from polyfunctional aliphatic acid and aliphatic anhydride having from 6 to 14 carbon atoms per molecule and mixtures thereof.

2. A composition of matter as in claim 1 wherein said lactam is selected from the group consisting of ε-caprolactam, 2-piperidone, 2-pyrrolidone, capryllactam and mixtures thereof, and said aliphatic acid material is selected from the group consisting of polysebacic acid anhydride, azelaic acid, sebacic acid, dodecanedioic acid and mixtures thereof.

3. A composition of matter as in claim 1 wherein said lactam is ε-caprolactam and said aliphatic acid is azelaic acid.

4. A composition of matter as in claim 1 wherein said lactam is ε-caprolactam and said aliphatic acid is dodecanedioic acid.

5. A composition of matter as in claim 1 wherein said lactam is ε-caprolactam and said aliphatic acid is sebacic acid.

6. A composition of matter as in claim 1 wherein said lactam is ε-caprolactam and said aliphatic acid is polysebacic acid anhydride.

7. A composition of matter as in claim 1 wherein said lactam is ε-caprolactam and said aliphatic acid is a mixture of polysebacic acid anhydride, azelaic acid and sebacic acid.

8. A composition of matter as in claim 1 wherein said lactam is capryllactam and said aliphatic acid is sebacic acid.

References Cited

UNITED STATES PATENTS

| | | |
|---|---|---|
| 2,839,495 | 6/1958 | Carey. |
| 2,847,342 | 8/1958 | Kohn. |
| 3,151,129 | 9/1964 | Luemann et al. |

WILLIAM H. SHORT, *Primary Examiner.*

T. D. KERWIN, *Assistant Examiner.*